United States Patent [19]
Nodorft et al.

[11] Patent Number: 6,131,689
[45] Date of Patent: Oct. 17, 2000

[54] ALL-WHEEL-STEER BIASING MECHANISM

[75] Inventors: Allen James Nodorft, Beaver Dam; James Jury Cinnamon, Horicon, both of Wis.

[73] Assignee: Deere & Company, Moline, Ill.

[21] Appl. No.: 09/210,164

[22] Filed: Dec. 11, 1998

[51] Int. Cl.[7] ................................................ B62D 7/14
[52] U.S. Cl. ...................... 180/409; 180/234; 280/91.1; 280/99
[58] Field of Search ........................... 280/91.1, 99, 100, 280/93.501; 180/234, 408, 409, 411

[56] References Cited

U.S. PATENT DOCUMENTS

| | | | |
|---|---|---|---|
| 868,337 | 10/1907 | Geist | 180/234 X |
| 1,599,262 | 9/1926 | Withell | |
| 1,821,063 | 9/1931 | Knight | |
| 1,830,552 | 11/1931 | Liimatta | |
| 2,234,888 | 3/1941 | Blagden | 280/91 |
| 4,441,735 | 4/1984 | Hutchison et al. | 280/771 |
| 4,553,768 | 11/1985 | Furukawa et al. | 280/91.1 |
| 4,738,459 | 4/1988 | Nakamura et al. | 280/91 |
| 4,881,613 | 11/1989 | Kanazawa et al. | 180/140 |
| 4,957,183 | 9/1990 | Mullett et al. | 180/234 |
| 4,977,733 | 12/1990 | Samejima et al. | 56/14.7 |
| 5,020,812 | 6/1991 | Sugiyama | 280/91.1 |
| 5,048,853 | 9/1991 | Trefz et al. | 280/91 |
| 5,076,597 | 12/1991 | Korekane et al. | 280/91.1 |
| 5,090,512 | 2/1992 | Mullet et al. | 180/236 |
| 5,174,595 | 12/1992 | Snipes | 280/91 |
| 5,288,091 | 2/1994 | Deschamps | 280/91 |
| 5,295,553 | 3/1994 | Morita et al. | 180/212 |
| 5,531,466 | 7/1996 | Hayashi | 280/91.1 |

FOREIGN PATENT DOCUMENTS 62-181960  10/1987  Japan ................................. 180/234

*Primary Examiner*—Brian L. Johnson
*Assistant Examiner*—F. Zeender

[57] ABSTRACT

An all-wheel-steer biasing mechanism having a torsion biasing spring which engages a rear wheel pivot plate between the rear wheel tie rods for biasing the rear wheel steering linkage back to a position corresponding to straight forward travel.

2 Claims, 4 Drawing Sheets

ALL-WHEEL-STEER BIASING MECHANISM

BACKGROUND OF THE INVENTION

It is known to provide vehicles such as lawn tractors with front wheel steering. These conventional lawn tractors typically include a pair of rear wheels that engage the ground and are driven by the lawn tractor's power source or internal combustion engine for propelling the lawn tractor across the ground. A pair of front ground engaging wheels are also provided which are typically not driven by the engine. The front wheels are pivotable to steer the vehicle for executing turns during forward and reverse vehicle travel. The front wheels are operatively coupled via a linkage to a steering wheel located in the vehicle operator station. The operator seated on a seat within the operator station grasps the steering wheel with his hands and turns the wheel in the direction of the desired turn. The linkage transmits the motion of the steering wheel to the front wheels and thereby executes a turn in the desired direction.

When the operator wishes to stop the vehicle from turning when traveling forwardly he can release the steering wheel, and the front wheels will tend to straighten out and assume positions corresponding to straight forward travel. The operator may wish to guide the steering wheel back to its straight forward position in order to control how quickly the vehicle comes out of the turn and straightens out. Since the wheels tend to straighten out by themselves after execution of a turn during forward travel, it is relatively easy for the operator to return the vehicle to its straight forward travel mode. The tendency of the front wheels to return to their straight forward orientation after a turn helps the operator return the steering wheel to its straight forward mode.

Some lawn tractors provide mechanical all-wheel-steering mechanisms, which serve to turn all of the vehicle's three or four ground engaging wheels to execute a turn. These vehicles have the advantage of being capable of relatively tight, small radius turns. This tight turning radius is desirable when using the lawn tractor to mow close around obstacles such as trees, posts or similar obstructions. All-wheel-steering mechanisms typically include a steering shaft extending downwardly from the vehicle. This steering shaft is operatively coupled with an arm that swings forward or backward as the steering shaft pivots in response to the steering wheel being turned by the operator. First and second link rods are coupled with the arm and extend fore and aft therefrom. The first and second link rods are operatively coupled with respective pivot plates between the front and rear pairs of wheels. Tie rods extend outwardly from each side of the pivot plates and are coupled with respective steering arms which control the angular orientation of each ground engaging wheel. As the steering shaft pivots, the outer end of the arm will shift fore or aft, which shifts the first and second link rods therewith. Shifting of the first and second link rods causes the front and rear pivot plates to swing to one side, which in turn shifts the tie rods, causing each wheel to turn in the proper direction during execution of a turn.

As described above, the front wheels' engagement with the ground during execution of a turn tend to apply a force which urges the front wheels back toward their straight forward orientation when the operator releases the steering wheel after execution of a turn during forward travel. However, the rear wheels' engagement with the ground tends not to urge the rear wheels back toward their straight forward orientation. Rather, engagement with the ground during turns in the forward direction of travel applies a force to the rear wheels that can tend to hinder the rear wheels from returning to their straight forward orientation. The rear wheels are linked with the front wheels via the steering linkage, and the force that tends to keep the rear wheels turned can counteract or overcome the force that tends to return the front wheels to the straight forward position. Therefore, it can be difficult for an operator to return the steering wheel and ground engaging wheels to the straight forward orientation after execution of a turn in the forward direction. This phenomenon can be particularly acute when the operator turns the steering wheel to its extreme turning positions corresponding with relatively tight turning radii. The operator may have difficulty returning the steering wheel to its straight forward mode. Furthermore, the operator may be unfamiliar with the handling of these all-wheel-steer lawn tractors since they tend to behave somewhat differently than front wheel steer lawn tractors.

It would therefore be desirable to provide a mechanical all-wheel-steer vehicle that is easily returned to straight forward travel when coming out of a turn. It would be desirable for such a steering mechanism to allow an operator to more easily return the steering wheel to its straight forward orientation when the operator wishes to again drive the vehicle straight forward after execution of a turn. It would also be desirable to provide a mechanical all-wheel-steering mechanism that handles more like a front wheel steering linkage than do conventional all-wheel-steering devices.

SUMMARY OF THE INVENTION

The present invention provides a biasing mechanism for an all-wheel-steer vehicle such as a lawn tractor. A vehicle steering linkage is provided having a steering wheel and steering shaft. A pinion gear coupled with the steering shaft meshes with a sector gear to which a slotted plate is fixed. A front wheel steering linkage is provided having a front link element coupled with the slotted plate for shifting fore and aft as the plate pivots in response to the steering wheel being turned by the operator. A front pivot plate connected with the front link element swings side to side in response to fore and aft shifting of the front link element, which in turn causes front tie rods to shift laterally. Shifting of the front tie rods causes the front wheel axles to pivot, causing the front wheels to turn for execution of a vehicle turn. A rear wheel steering linkage is also provided, and includes a rear link element engaged within the slot formed in the slotted plate. As the slotted plate swings laterally, the rear link element shifts fore and aft. A lever, pivot shaft and rear pivot plate are operatively coupled with the rear portion of the rear link element and swing together from side to side in response to fore and aft shifting of the rear link element. Tie rods coupled with the rear pivot plate extend laterally outwardly to arms mounted with the rear wheels. As the rear pivot plate swings from side to side the tie rods shift to swing the rear wheels in the same direction for execution of a vehicle turn.

A torsion biasing spring coils around the pivot shaft at the rear of the vehicle. One end of the torsion spring engages a bracket which supports the pivot shaft, and the other end of the torsion spring engages the rear pivot plate. With the rear wheels oriented straight forward the torsion spring is in a neutral position and does not apply any force to the rear pivot plate. When the rear wheels are turned from the straight forward orientation, the biasing spring applies a force to the rear pivot plate that urges the rear pivot plate back to its position corresponding to straight forward travel. The biasing spring thereby assists the operator in returning the wheels to a straight forward condition after execution of a turn. The biasing spring helps overcome the forces applied to the linkage caused by engagement of the rear wheels against the ground when the rear wheels are turned during a tight vehicle turn. The vehicle steering linkage according to the present invention therefore handles more like a front-wheel-steer vehicle than conventional all-wheel-steer vehicles in the sense that the steering linkage can be returned to its straight forward orientation relatively easily.

The slot formed in the slotted plate establishes a delay in the steering of the rear wheels. As the operator begins to turn the steering wheel from its straight forward position only the front wheels will turn. During this initial range of turning, a pin coupled with the rear link element is positioned within a central portion of the slot which is shaped so as to not shift the rear link element fore or aft. As the operator continues to turn the steering wheel, the pin shifts into secondary portions of the slot which are shaped so as to shift the rear link element fore or aft as the steering wheel is turned. This initiates turning of the rear wheels. The particular shape of the slot therefore causes only the front wheels to be turned in large radius turns, and causes both the front and rear wheels to turn when the steering wheel is turned more to execute a tighter vehicle turn.

The biasing spring engages the rear pivot plate which forms part of the rear steering linkage. The rear steering linkage remains in its straight forward travel mode when the steering wheel is turned only slightly, and therefore the biasing spring does not affect the turning of the front wheels when only the front wheels and not the rear wheels are turned during execution of a vehicle turn. The slotted plate effectively isolates the biasing spring from the front steering linkage when slight turns are executed. Therefore, the biasing spring according to the present invention does not affect the handling of the steering system when only the front wheels are steered.

The biasing spring engages the rear steering linkage at a location relatively close to the rear wheels which encounter forces from the ground that tend to hinder the rear wheels from returning to a straight forward position after execution of a turn in the forward direction of travel. This location of the biasing spring helps reduce stresses in the steering linkage during execution of a turn. Stresses in the steering linkage between the biasing spring and the rear wheels are relatively high during execution of a turn, but stresses in the other portions of the vehicle steering linkage are relatively small.

DESCRIPTION OF THE PREFERRED EMBODIMENT

Figure 1:
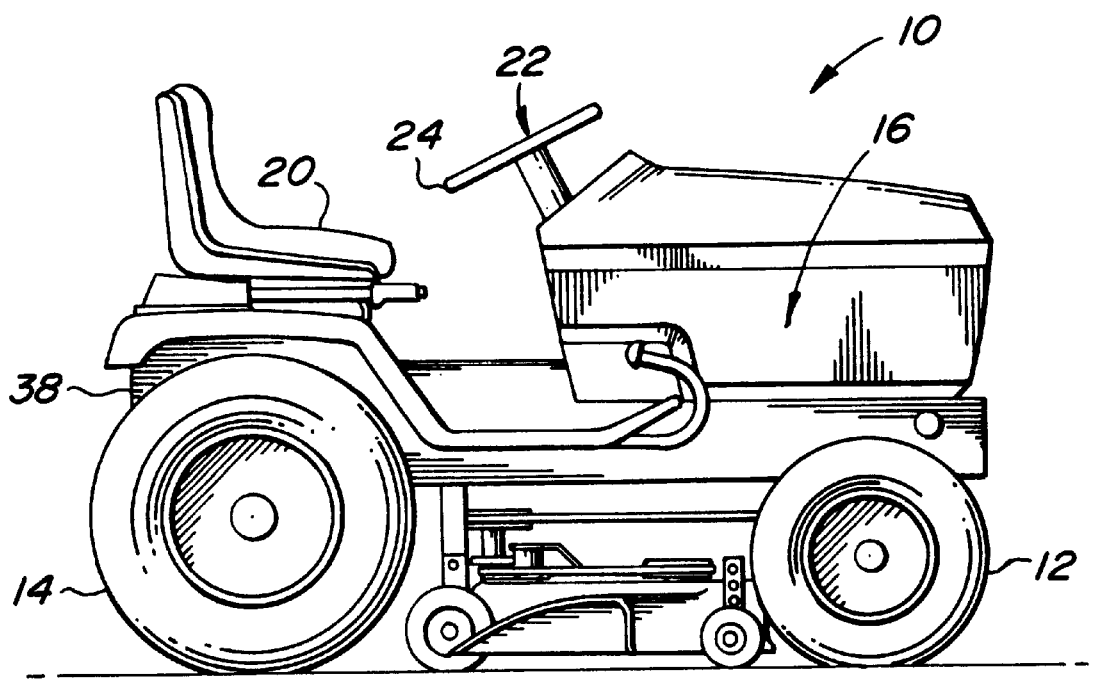
FIG. 1 is a side view of a lawn tractor vehicle with which the present invention is adapted for use.
Figure 2:
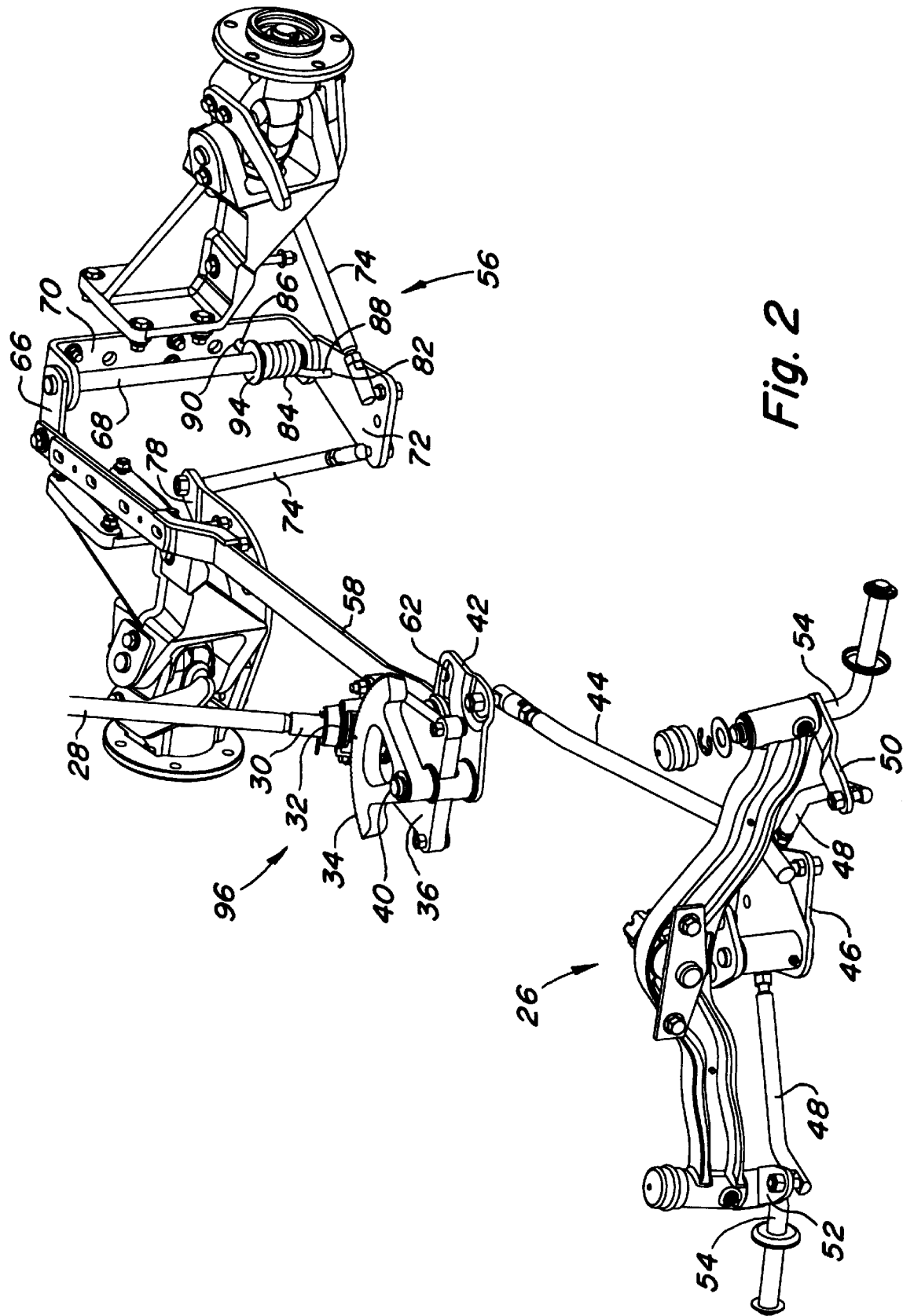
FIG. 2 is a partial perspective view of the steering linkage showing the biasing spring according to the present invention. The vehicle frame and ground engaging wheels are not shown in FIG. 2.
Figure 3:
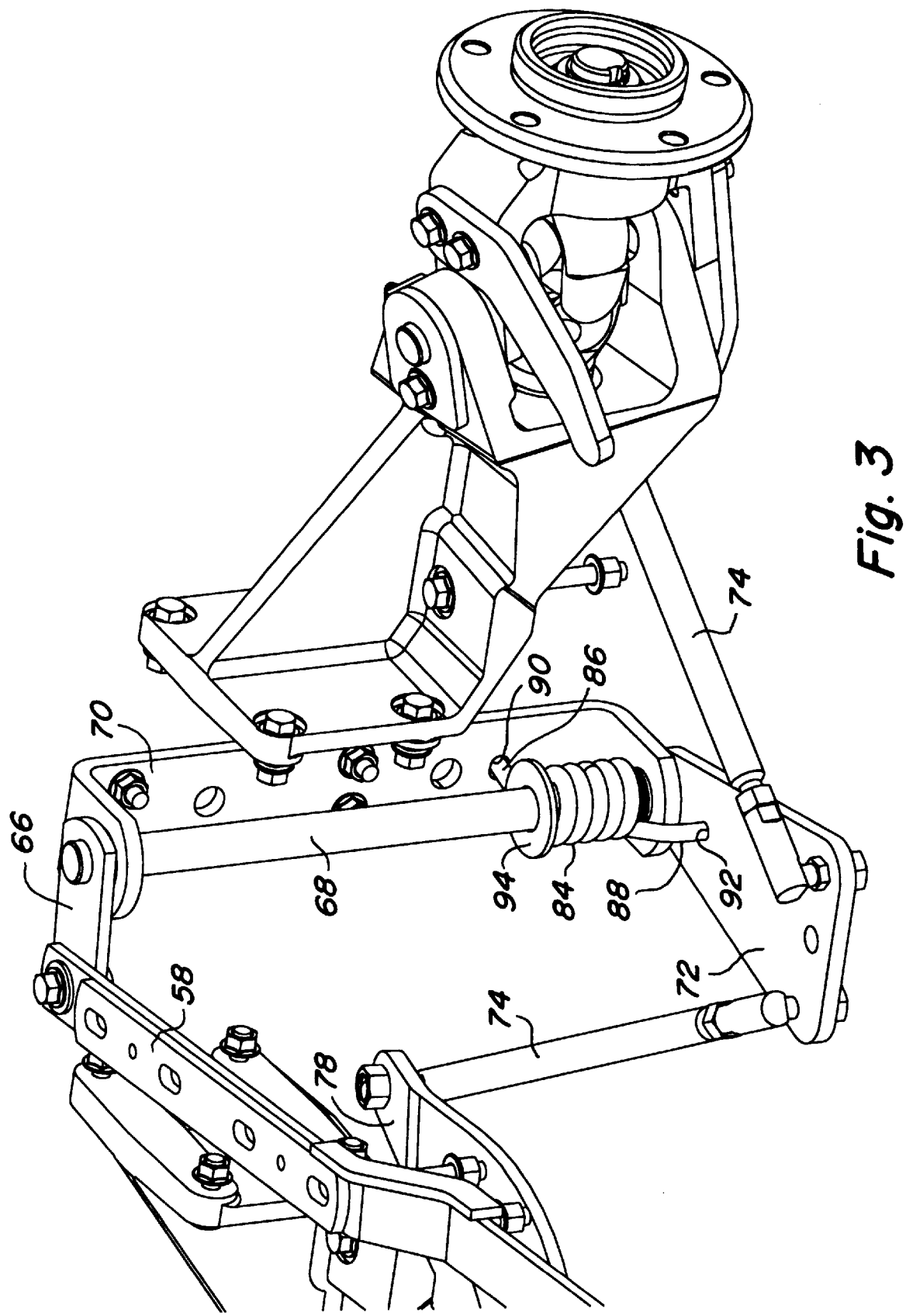
FIG. 3 is a close-up, perspective view of the biasing spring of FIG. 2 according to the present invention.
Figure 4:
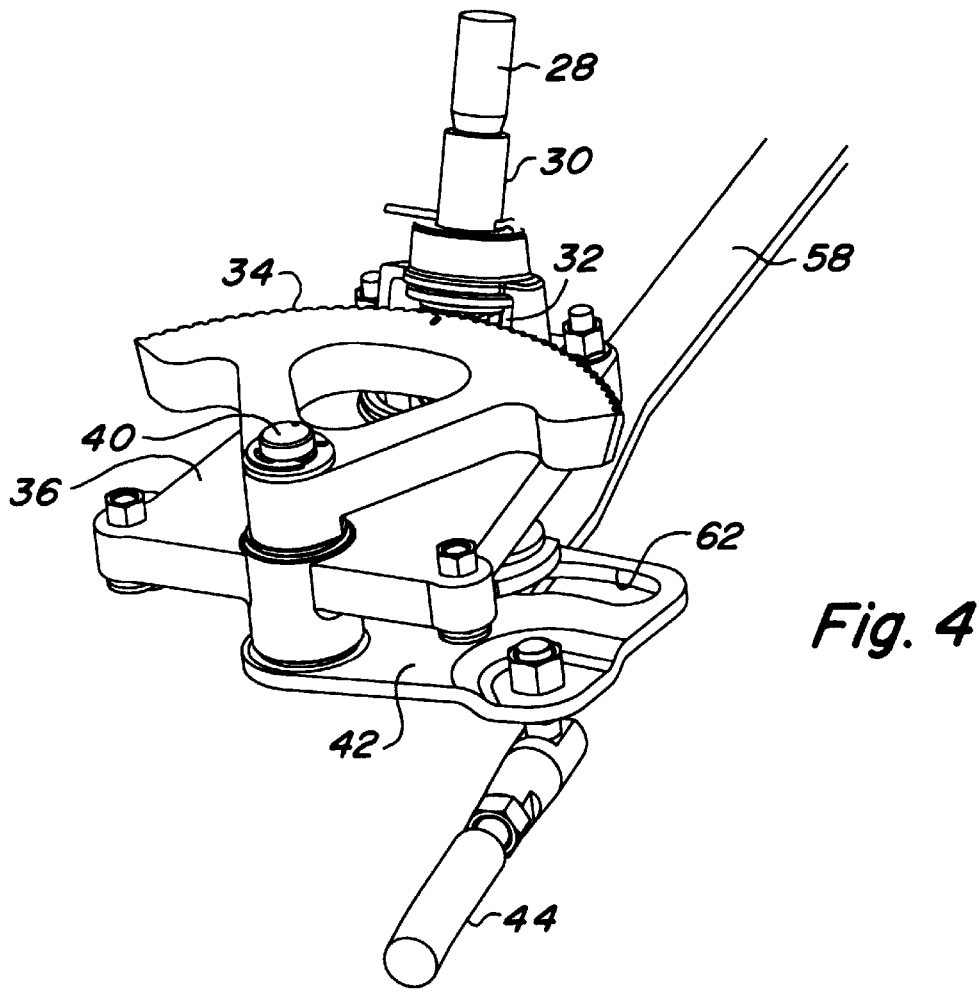
FIG. 4 is a partial perspective view of a portion of the steering linkage of FIGS. 2 and 3, showing in detail the steering pinion and sector gears, and the slotted plate which establishes a delay in the steering of the rear wheels.
Figure 5:
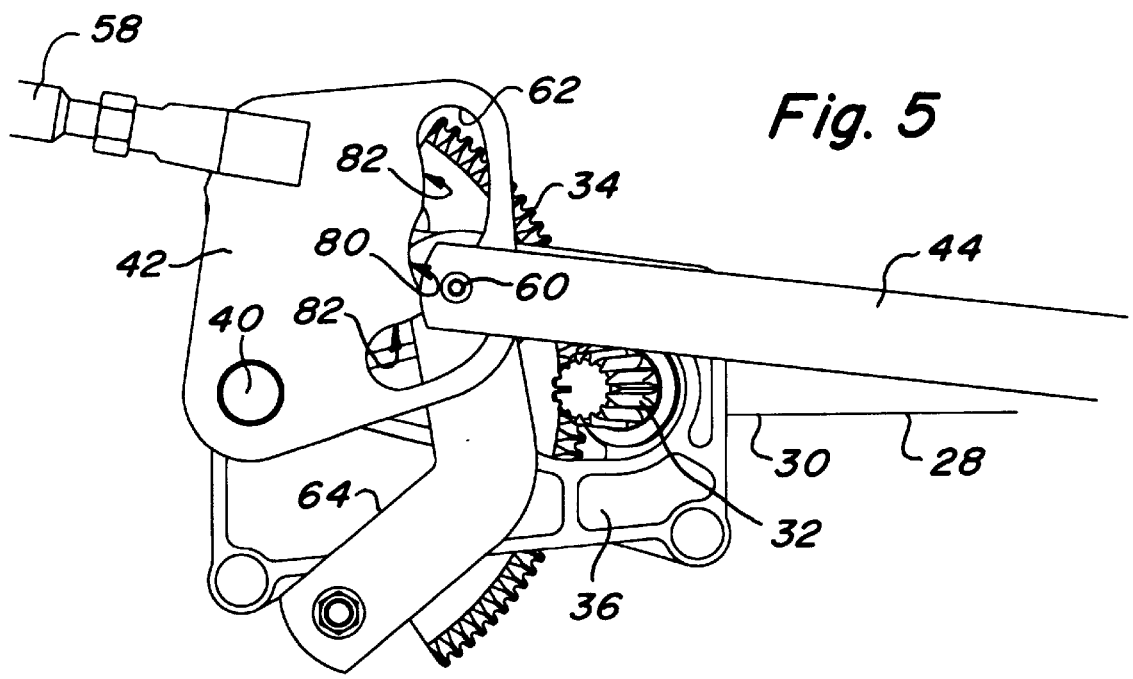
FIG. 5 is a view from beneath the steering pinion and sector gears of FIG. 4, showing in detail the slot formed in the slotted plate.

Referring now to FIGS. 1–5, there is shown the preferred embodiment of the present invention. A lawn tractor vehicle 10 includes pairs of front and rear ground engaging wheels 12 and 14. The rear wheels 14 are driven by an engine 16 supported at the front of the vehicle 10. An operator station 18 includes a seat 20 upon which an operator sits during operation of the vehicle 10. Various vehicle controls 22 are located in the operator station 18 and are engagable by the operator for controlling operation of the vehicle 10. A steering wheel 24 is mounted in the operator station 18 in conventional fashion such that the seated operator can steer the lawn tractor 10 by turning the steering wheel 24.

Next, the front steering linkage 26 will be described in greater detail. A steering shaft 28 is coupled to and extends downwardly from the steering wheel 24. At the lower end 30 of the steering shaft 28 is a pinion gear 32 in mesh with a sector gear 34. The pinion gear 32 and sector gear 34 are each pivotably supported by a support plate 36 bolted or otherwise fixed with the tractor frame 38. A sector pin 40 is fixed with the sector gear 34 and defines the axis about which the sector gear 34 pivots. The sector pin 40 extends downwardly through the support plate 36. A slotted plate 42 is fixed with the lower end of the sector pin 40 for pivoting therewith. A front link element 44 is pivotally fixed with the slotted plate 42 and extends forwardly toward the front of the vehicle 10. The front link element 44 is pivotally coupled with a front pivot plate 46. A pair of front tie rods 48 are pivotally mounted with the front pivot plate 46, and extend laterally outwardly therefrom for connection with left and right front arms 50 and 52. The arms 50 and 52 are operatively fixed with the front wheel spindles or axles 54 for pivoting the front wheels 12 during execution of a vehicle turn.

As the operator turns the steering wheel 24, the steering shaft 28 and pinion gear 32 rotate with the steering wheel 24. In response to rotation of the pinion gear 32, the sector gear member 34 in mesh with the pinion gear 32 pivots about the axis defined by the sector pin 40. The sector pin 40 and slotted plate 42 pivot with the sector gear member 34, which causes the front link element 44 to shift fore or aft with the slotted plate 42. The front pivot plate 46 pivots to the left or right in response to the front link element 44 shifting fore or aft, which in turn causes the tie rods 48 to shift in unison to turn the front wheels 12 in the same direction for executing a vehicle turn.

Next, the rear steering linkage 56 will be described in greater detail. A rear link element 58 is coupled with the slotted plate 42 by way of a pin 60 received within a slot 62 in the slotted plate 42. The pin 60 shifts within the slot 62 as the slotted plate 42 pivots in response to turning of the steering wheel 24, as will be described in greater detail below. A guide arm 64 has one end pivotally supported by the support plate 36 and its other end pivotally connected with the pin 60. The rear link element 58 extends rearwardly from the pin 60 and is pivotally coupled with a lever 66 mounted at the top of a pivot shaft 68. The pivot shaft 68 is pivotally supported by a bracket 70 mounted as by bolts to the tractor frame 38. The lower end of the pivot shaft 68 is fixed with a rear pivot plate 72. A pair of rear tie rods 74 are coupled with the rear pivot plate 72 and are each connected with a respective rear arm member 76 and 78. The rear arm members 76 and 78 are pivotable for pivoting each rear wheel 14 for executing a turn. A universal joint transmits power to each of the pivoting rear wheels 14, and are adapted to transmit rotational motion to the rear wheels 14 while accommodating pivoting of the rear wheels during execution of a turn.

As the operator turns the steering wheel 24, the steering shaft 28 and pinion gear 32 pivot therewith. The sector gear 34, sector pin 40 and slotted plate 42 pivot together in response to rotation of the pinion gear 32. When the steering wheel 24 is turned within an initial range of motion from the straight forward position the pin 60 slides within a central portion 80 of the slot 62. The central portion 80 of the slot 62 is oriented and shaped such that when the pin 60 is in the central portion 80 the slotted plate 42 will not shift the pin 60 fore or aft as the slotted plate 42 pivots. As the slotted plate 42 pivots out of the initial range and into secondary ranges the pin 60 will shift into secondary portions 82 of the slot 62. The secondary portions 82 of the slot 62 are oriented and shaped such that pivotal motion of the slotted plate 42 causes the pin 60 to shift fore or aft when the pin 60 is within the secondary portions 82 of the slot 62. This causes the rear link element 58 to shift fore or aft, thereby turning the rear wheels 14 via the rear steering linkage 56. The shape of the slot 62 functions to delay the turning of the rear wheels 14 when the steering wheel 24 is turned from the straight forward mode. In other words, when the steering wheel 24 is turned initially within an initial range of motion from the straight forward position only the front wheels 12 turn. As the steering wheel 24 is turned further through a secondary range of motion, the pin 60 shifts into a secondary portion 82 of the slot 62, which causes the rear wheels 14 to turn. When the steering wheel 24 is turned only slightly from the straight forward position only the front wheels 12 are turned to steer the vehicle 10, but when the steering wheel 24 is turned further from the straightforward position both the front and the rear wheels 12 and 14 are turned for execution of a relatively tight turn having a relatively small radius.

The present invention also provides a torque spring 84 having first and second end portions 86 and 88 engaged within openings 90 and 92 formed in the bracket 70 and the rear pivot plate 72. The torsion spring 84 is coiled around the pivot shaft 68. A washer member 94 is welded to the pivot shaft 68 for holding the spring 84 in the proper position and blocks the spring 84 from shifting upwardly on the pivot shaft 68. The torque spring 84 does not apply any force to the rear pivot plate 72 when the rear steering linkage 56 and rear pivot plate 72 are positioned in the straight forward orientation. When the steering wheel 24 is turned and the rear pivot plate 72 swings to one side the torque spring 84 flexes and applies a force to the rear pivot plate 72. The spring 84 will press against the bracket 70 and apply a force to the rear pivot plate 72 in a direction back toward the centered position corresponding with straight forward vehicle travel.

As described above, the rear wheels of an all-wheel-steer lawn tractor tend not to be urged back toward a straight forward orientation when a turn is completed. Rather, the engagement of the rear wheels against the ground during execution of a turn tends to establish forces which hinder the rear wheels from returning to the straight forward orientation. As an operator turns the steering wheel of an all-wheel-steer vehicle back toward the straight forward position, the turned rear wheels can transmit forces to the steering wheel that make it difficult for the operator to return the steering wheel to its straight forward position. The torque spring 84 according to the present invention applies a force to the rear steering linkage 56 for overcoming these forces established by rolling contact with the ground. The spring 84 acts to bias the rear steering linkage 56 back toward its straight forward position. The spring 84 assists the operator in returning the steering wheel 24 and steering linkage 96 back to the straight forward position. The spring 84 thereby allows the steering linkage 96 to behave or handle more like a front-wheel steer linkage than do conventional all-wheel-steer vehicles.

The biasing spring 84 engages the rear pivot plate 72, and is therefore positioned relatively close to the forces applied to the rear wheels 14 by the ground surface which tend to keep the rear wheels 14 turned. The spring 84 therefore engages the steering linkage 96 relatively close to the force that the spring 84 is trying to overcome. Portions of the steering linkage 96 between the spring 84 and the steering wheel 24 encounter lower stresses during operation due to the proximity of the spring 84 to the rear wheels 14. The spring 84 counteracts the forces applied by the ground to the rear wheels which hinder the rear wheels from turning back to the straight travel orientation. These forces from the ground surface are transmitted through the wheel and through the linkage until the force encounters or is dissipated by the spring. Stresses in the steering linkage between the biasing spring 84 and the rear wheels are relatively high during execution of a turn, but stresses in the other portions of the vehicle steering linkage are relatively small. If the spring 84 engaged the rear link element 58 instead of the rear pivot plate 72 as shown, the pivotal connection between the rear link element 58 and the lever member 66 would encounter relatively large forces during execution of a tight turn. The location of the engagement of the biasing spring 84 with a portion of the steering linkage 96 proximate the rear wheels 14 helps reduce the forces and stresses encountered by most of the steering linkage 96.

The biasing spring 84 directly engages the rear steering linkage 56, and, more specifically, the rear pivot plate 72. Because the biasing spring 84 engages the rear steering linkage 56, the biasing spring 84 does not affect the handling of the front steering linkage 26 when the steering wheel 24 is turned only slightly from the straight forward position. When only the front wheels 12 are turned, such as when executing slight turns, the biasing spring 84 is effectively isolated from the front steering linkage 26 by the operation of the slot 62 in the slotted plate 42. Therefore, vehicle handling is not affected by the biasing spring 84 when only the front wheels 12 turn during execution of slight turns. Therefore the lawn tractor 10 will behave or handle as expected like a front-wheel-steer vehicle during slight turns. The biasing spring 84 only effects the steering or handling of the vehicle 10 when the rear wheels 14 begin to turn when the pin 60 is in the secondary portions 82 of the slot 62 such as when executing relatively tight vehicle turns.

What is claimed is:

1. A mechanism, comprising:

a vehicle having a pair of steerable front wheels, and a pair of steerable rear wheels, an operator steering control supported by the vehicle and engagable by the operator for controlling the steering of the front and rear steerable wheels, a mechanical vehicle steering linkage supported by the vehicle and operatively extending between the operator steering control and the front and rear steerable wheels, wherein the vehicle steering linkage further comprises a front wheel linkage which operatively extends between the front steerable wheels, and a rear wheel linkage operatively extending between the rear steerable wheels, the rear wheel linkage further comprises a pair of tie rods operatively coupled with respective rear steerable wheels, and a pivot plate to which each tie rod is operatively connected, and a biasing mechanism which directly engages the rear wheel linkage pivot plate and urges the pivot plate and rear steerable wheels toward a position corresponding with straight forward travel of the vehicle, said biasing mechanism further comprises a torque spring engaged between the pivot plate and the vehicle, the torque spring having a neutral position whereat the torque spring applies no biasing force to the pivot plate, and the neutral position corresponds to orientation of the pivot plate when the vehicle travels straight forward.

2. A mechanism, comprising:

a vehicle having a pair of steerable front wheels, and a pair of steerable rear wheels, an operator steering control supported by the vehicle and engagable by the operator for controlling the steering of the front and rear steerable wheels, a mechanical vehicle steering linkage supported by the vehicle and operatively extending between the operator steering control and the front and rear steerable wheels, wherein the vehicle steering linkage further comprises a front wheel linkage which operatively extends between the front steerable wheels, and a rear wheel linkage operatively extending between the rear steerable wheels, the rear wheel linkage further comprises a pair of tie rods operatively coupled with respective rear steerable wheels, and a pivot plate to which each tie rod is operatively connected, a biasing mechanism which directly engages the rear wheel linkage pivot plate and urges the pivot plate and rear steerable wheels toward a position corresponding with straight forward travel of the vehicle, said biasing mechanism further comprises a torque spring engaged between the pivot plate and the vehicle, the torque spring having a neutral position whereat the torque spring applies no biasing force to the pivot plate, and the neutral position corresponds to orientation of the pivot plate when the vehicle travels straight forward, and wherein the vehicle steering linkage further comprises a delay mechanism coupled between the front and rear steerable pairs of wheels, said delay mechanism steers only the front steerable wheels when the operator steering control is shifted within an initial range of motion, and steers both the front and rear steerable pairs of wheels as the operator steering control is shifted past the initial range of motion and into a secondary range of motion.

* * * * *